US009891476B2

(12) United States Patent
Lee et al.

(10) Patent No.: US 9,891,476 B2
(45) Date of Patent: *Feb. 13, 2018

(54) SUBSTRATE AND LIQUID CRYSTAL DISPLAY DEVICE INCLUDING THE SAME

(71) Applicant: LG DISPLAY CO., LTD., Seoul (KR)

(72) Inventors: Jae-Won Lee, Goyang-si (KR); So-Young Noh, Seoul (KR); Sung-Ki Kim, Goyang-si (KR); Jin-Pil Kim, Paju-si (KR); Kyung-Mo Son, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/690,775

(22) Filed: Apr. 20, 2015

(65) Prior Publication Data

US 2015/0226989 A1    Aug. 13, 2015

Related U.S. Application Data

(62) Division of application No. 13/275,991, filed on Oct. 18, 2011, now Pat. No. 9,046,715.

(30) Foreign Application Priority Data

Oct. 18, 2010  (KR) .......................... 10-2010-0101313

(51) Int. Cl.
*G02F 1/1339*    (2006.01)
*G02F 1/1337*    (2006.01)
(Continued)

(52) U.S. Cl.
CPC .......... *G02F 1/1339* (2013.01); *G02F 1/1337* (2013.01); *G02F 1/13394* (2013.01);
(Continued)

(58) Field of Classification Search
CPC .. G02F 1/1345; G02F 1/1339; G02F 1/13394; G02F 1/1337; G02F 1/1368; G02F 2001/13396
See application file for complete search history.

(56) References Cited

U.S. PATENT DOCUMENTS

| | | | |
|---|---|---|---|
| 5,513,028 A | | 4/1996 | Sono et al. |
| 6,055,034 A | * | 4/2000 | Zhang .................. G02F 1/1339 349/151 |

(Continued)

FOREIGN PATENT DOCUMENTS

| | | |
|---|---|---|
| CN | 1519628 A | 8/2004 |
| KR | 1020090045048 A | 5/2009 |

(Continued)

OTHER PUBLICATIONS

Office Action issued in corresponding Korean Patent Application No. 10-2010-0101313, dated Mar. 22, 2013.

(Continued)

*Primary Examiner* — Dung Nguyen
(74) *Attorney, Agent, or Firm* — Seed Intellectual Property Law Group LLP

(57) ABSTRACT

A substrate for a liquid crystal display device includes: a substrate including a display region displaying an image and a non-display region surrounding the display region; a dummy pattern in the non-display area over the substrate, the dummy pattern having a length that corresponds to a side of the display area; and an orientation film on the dummy pattern, the orientation film covering the non-display area and the whole display area.

13 Claims, 12 Drawing Sheets

(51) Int. Cl.
  *G02F 1/1335* (2006.01)
  *G02F 1/1333* (2006.01)
  *G02F 1/1362* (2006.01)
  *G02F 1/1368* (2006.01)

(52) U.S. Cl.
  CPC ...... *G02F 1/133512* (2013.01); *G02F 1/1368* (2013.01); *G02F 1/133514* (2013.01); *G02F 1/133784* (2013.01); *G02F 1/136286* (2013.01); *G02F 2001/13396* (2013.01); *G02F 2001/133388* (2013.01)

(56) References Cited

U.S. PATENT DOCUMENTS

| | | | |
|---|---|---|---|
| 7,486,368 B2* | 2/2009 | Sakakura | H01L 51/5237 349/153 |
| 7,944,540 B2 | 5/2011 | Kim et al. | |
| 8,345,173 B2* | 1/2013 | Cho | G02F 1/136286 345/173 |
| 8,368,074 B2* | 2/2013 | Koo | H01L 29/786 257/232 |
| 8,395,749 B2* | 3/2013 | Kobayashi | G02F 1/1362 349/110 |
| 9,046,715 B2* | 6/2015 | Lee | G02F 1/133784 |
| 2004/0263705 A1 | 12/2004 | Seo et al. | |
| 2005/0117093 A1 | 6/2005 | Kim et al. | |
| 2008/0129946 A1* | 6/2008 | Chan | G02F 1/1339 349/153 |
| 2009/0066903 A1* | 3/2009 | Yoshida | G02F 1/1339 349/153 |
| 2010/0022156 A1 | 1/2010 | Kim et al. | |

FOREIGN PATENT DOCUMENTS

| | | |
|---|---|---|
| TW | 200700814 A | 1/2007 |
| TW | 200739141 A | 10/2007 |
| TW | 200921229 A | 5/2009 |
| TW | 201009438 A | 3/2010 |

OTHER PUBLICATIONS

OffiCe Action issued in corresponding Taiwanese Patent Application No. 100137583, dated Jun. 13, 2014, 13 pages.

* cited by examiner

170

170

SUBSTRATE AND LIQUID CRYSTAL DISPLAY DEVICE INCLUDING THE SAME

PRIORITY CLAIM

The present patent document is a divisional of U.S. patent application Ser. No. 13/275,991, filed Oct. 18, 2011, which claims priority to Korean Patent Application No. 10-2010-0101313 filed in Korea on Oct. 18, 2010, which are hereby incorporated by reference by their entirety.

BACKGROUND

Field of the Disclosure

The present disclosure relates to a liquid crystal display device, and more particularly, to a substrate having a means for preventing a mount of an orientation film and a liquid crystal display device including the substrate.

Discussion of the Related Art

Recently, a liquid crystal display (LCD) device has been in the spotlight as a next generation display device having high value added because of its low power consumption and good portability.

An active matrix liquid crystal display (AM-LCD) device, which includes thin film transistors as a switching device for a plurality of pixels, has been widely used due to its high resolution and superiority in displaying moving images.

In general, the LCD device is fabricated through an array substrate process for forming a thin film transistor and a pixel electrode on an array substrate, a color filter substrate process for forming a color filter layer and a common electrode on a color filter substrate and a cell process for forming a liquid crystal layer between the array substrate and a color filter substrate.

FIG. 1 is an exploded perspective view showing a liquid crystal display device according to the related art. In FIG. 1, the liquid crystal display (LCD) device includes an array substrate 10, a color filter substrate 20 and a liquid crystal layer 30 between the array substrate 10 and the color filter substrate 20. The array substrate 10 includes a first substrate 12, a gate line 14 on the first substrate 12, a data line 16 crossing the gate line 14 to define a pixel region P, a thin film transistor (TFT) T connected to the gate line 14 and the data line 16 and a pixel electrode 18 connected to the TFT T.

In addition, the color filter substrate 20 facing the array substrate 10 includes a second substrate 22, a black matrix 25 blocking a non-display area corresponding to the gate line 14, the data line 16 and the TFT T, a color filter layer 26 including red, green and blue color filters 26a, 26b and 26c each corresponding to the pixel region P and a common electrode 28 on an entire surface of the second substrate 22.

Although not shown in FIG. 1, a seal pattern may be formed in a boundary portion between the array substrate 10 and the color filter substrate 20 for preventing leakage of the liquid crystal layer 30. A lower orientation film may be formed between the array substrate 10 and the liquid crystal layer 30 and an upper orientation film may be formed between the color filter substrate 20 and the liquid crystal layer 30 for aligning the liquid crystal layer initially. Further, a polarizing plate may be formed on an outer surface of at least one of the first and second substrates 12 and 22.

A backlight unit may be disposed under the array substrate 10 to supply light. When a gate signal turning on the TFT T is sequentially supplied to the gate line 14, the TFT T is turned on and a data signal supplied to the data line 16 is applied to the pixel electrode 18 through the TFT T. As a result, a vertical electric field is generated between the pixel electrode 18 and the common electrode 28 and liquid crystal molecules in the liquid crystal layer 30 are re-aligned by the vertical electric field, thereby the LCD device displaying images due to transmittance change of the liquid crystal layer 30.

The array substrate 10 is fabricated by forming the gate line 14, the data line 16, the TFT T and the pixel electrode 18 on the first substrate 12 through a depositing step, an exposing step, a developing step and an etching step for a source material. The color filter substrate is fabricated by forming the color filter layer 26 and the common electrode 28 on the second substrate 22. In addition, a liquid crystal panel is fabricated by attaching the array substrate 10 and the color filter substrate 12 with the liquid crystal layer 30 interposed therebetween and the LCD device is completed by attaching a driving circuit to the liquid crystal panel.

Since the LCD device uses an electro-optical effect of the liquid crystal that is determined by anisotropy and arrangement state of the liquid crystal molecules, adjustment of the arrangement state of the liquid crystal molecules influences stabilization in display quality of the LCD device. To obtain a uniform initial arrangement state of the liquid crystal molecules, an orientation process is performed.

In the orientation process, an orientation film is formed on each of the array substrate and the color filter substrate by printing a polymeric material such as polyimide and the orientation film is rubbed with a rubbing cloth along a predetermined direction. As a result, a polymer chain in the orientation film is aligned along the predetermined direction to have a directivity and the liquid crystal molecules have a uniform initial arrangement state due to the orientation film.

When the orientation film is formed to have a non-uniform thickness over a display area in the printing step, the orientation film is deteriorated in the subsequent rubbing step. Accordingly, the orientation film is required to have a uniform thickness.

FIG. 2 is a cross-sectional view showing a printing apparatus of an orientation film according to the related art, and FIG. 3 is a cross-sectional view showing a transferring plate and a substrate in a printing apparatus of an orientation film according to the related art. In FIG. 2, a plate cylinder 51 and a substrate 60 contact each other with a transferring plate 53 interposed therebetween, and a polymeric material is transferred to the substrate 60 by adding a pressure to form an orientation film 63. Since the transferring plate 53 having the polymeric material contacts and is pressurized toward the substrate 60, the polymeric material transferred from the transferring plate 53 to the substrate 60 is spread out toward all directions. Although the orientation film 63 corresponding to a pattern region 54 (of FIG. 3) has a uniform thickness, the orientation film 63 corresponding to an outside of the pattern region 54 has a greater thickness because the orientation film 63 is not pressurized.

In FIG. 3, the orientation film 63 on the substrate 60 includes a starting portion 63a, an ending portion 63b and a central portion 63c. Due to rotation of the plate cylinder 51 (of FIG. 2), the pattern region 54 of the transferring plate 53 starts contacting the substrate 60 to form the starting portion 63a and stop contacting the substrate 60 to form the ending portion 63b. Since the polymeric material is pushed out from the central portion 63c to the starting and ending portions 63a and 63b, a thickness of each of the starting and ending portions 63a and 63b is three or four times as great as a thickness of the central portion 63c. The starting and ending portions 63a and 63b may be referred to as a mount of the orientation film 63.

The mount causes deterioration of the orientation film 63 in a subsequent rubbing step. In addition, since the starting and ending portions of the orientation film 63 have a zigzag line, the ending portion belonging to the non-display area is designed to have a relatively great width. As a result, a bezel region corresponding to the non-display area is enlarged.

SUMMARY

A substrate for a liquid crystal display device includes: a substrate including a display region displaying an image and a non-display region surrounding the display region; a dummy pattern in the non-display area over the substrate, the dummy pattern having a length that corresponds to a side of the display area; and an orientation film on the dummy pattern, the orientation film covering the non-display area and the whole display area.

In another aspect, a liquid crystal display device includes: first and second substrate facing and spaced apart from each other, the first and second substrates including a display region displaying an image and a non-display region surrounding the display region; a gate line and a data line over an inner surface of the first substrate, the gate line and the data line crossing each other to define a pixel region; a thin film transistor connected to the gate line and the data line; a pixel electrode connected to the thin film transistor; a first dummy pattern in the non-display area over the inner surface of the first substrate, the first dummy pattern having a length that corresponds to a side of the display area; a first orientation film on the pixel electrode and the first dummy pattern; a black matrix over an inner surface of the second substrate; a color filter layer in the pixel region, the color filter layer including red, green and blue color filters sequentially repeated in the pixel region; and a plurality of patterned spacers on the color filter layer, the plurality of pattered spacers spaced apart from each other and corresponding to the black matrix; a second dummy pattern in the non-display area over the inner surface of the second substrate, the second dummy pattern having a length that corresponds to the side of the display area; a second orientation film on the plurality of patterned spacers and the second dummy pattern; and a liquid crystal layer between the first and second orientation films.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EXEMPLARY EMBODIMENTS

Reference will now be made in detail to the preferred embodiments, examples of which are illustrated in the accompanying drawings.

Figure 1:
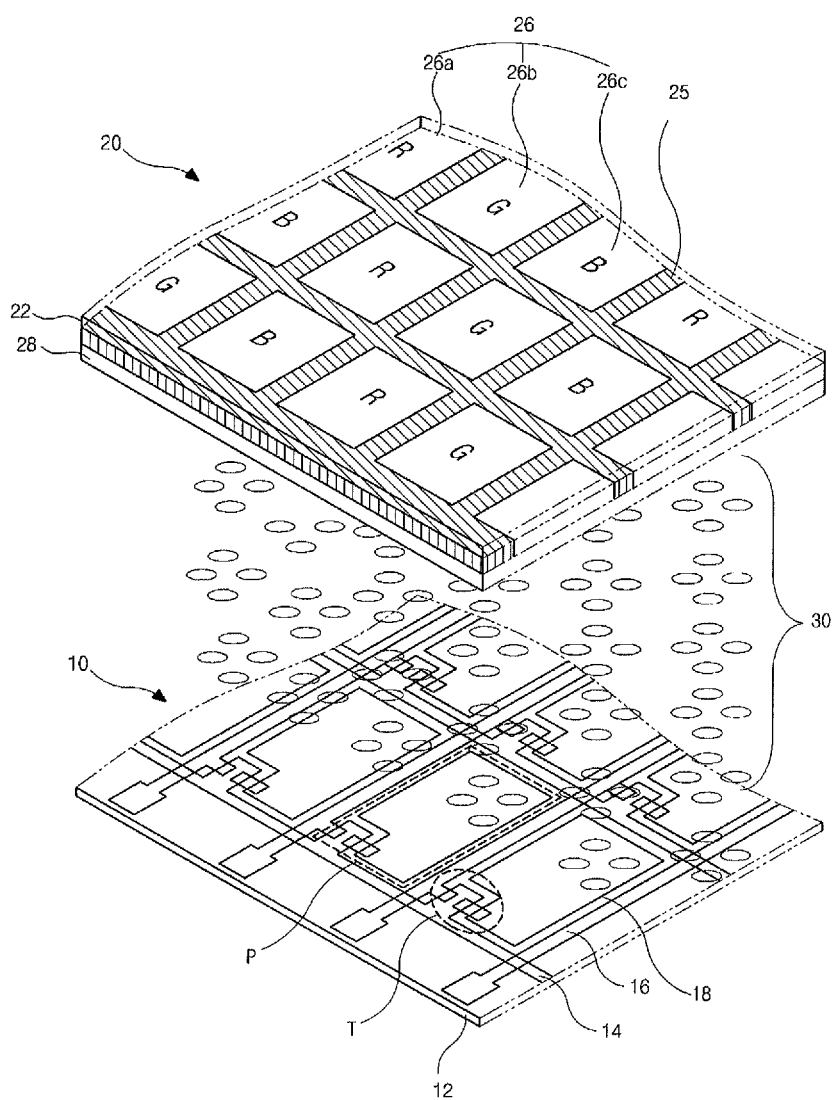
FIG. 1 is an exploded perspective view showing a liquid crystal display device according to the related art.
Figure 2:
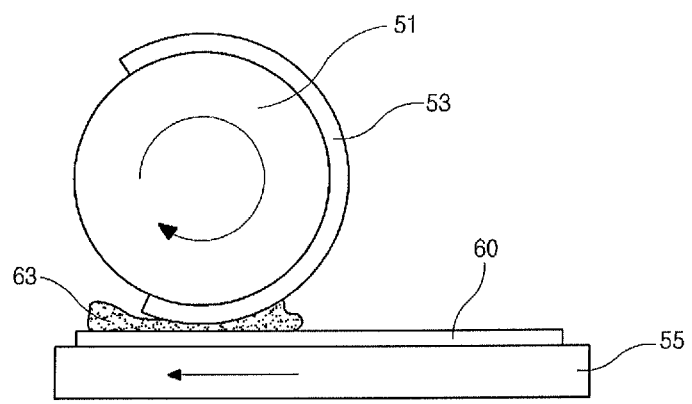
FIG. 2 is a cross-sectional view showing a printing apparatus of an orientation film according to the related art.
Figure 3:
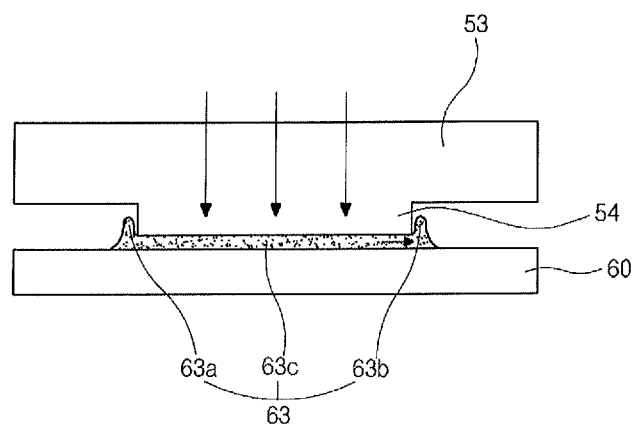
FIG. 3 is a cross-sectional view showing a transferring plate and a substrate in a printing apparatus of an orientation film according to the related art.
Figure 4A:
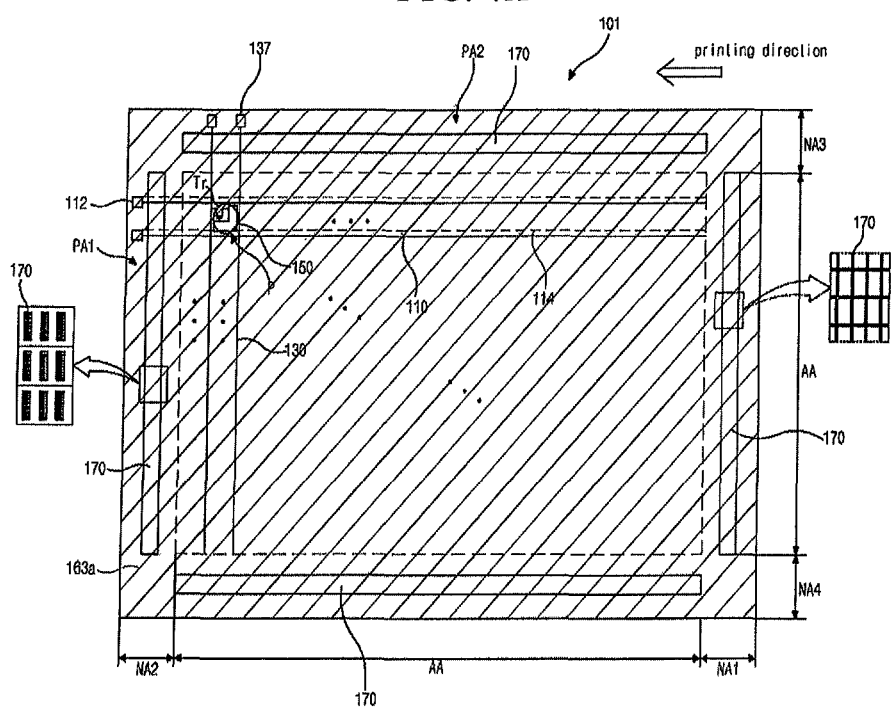
FIGS. 4A and 4B are plan views showing an array substrate and a color filter substrate, respectively, for a liquid crystal display device according to an embodiment of the present invention.
Figure 4B:
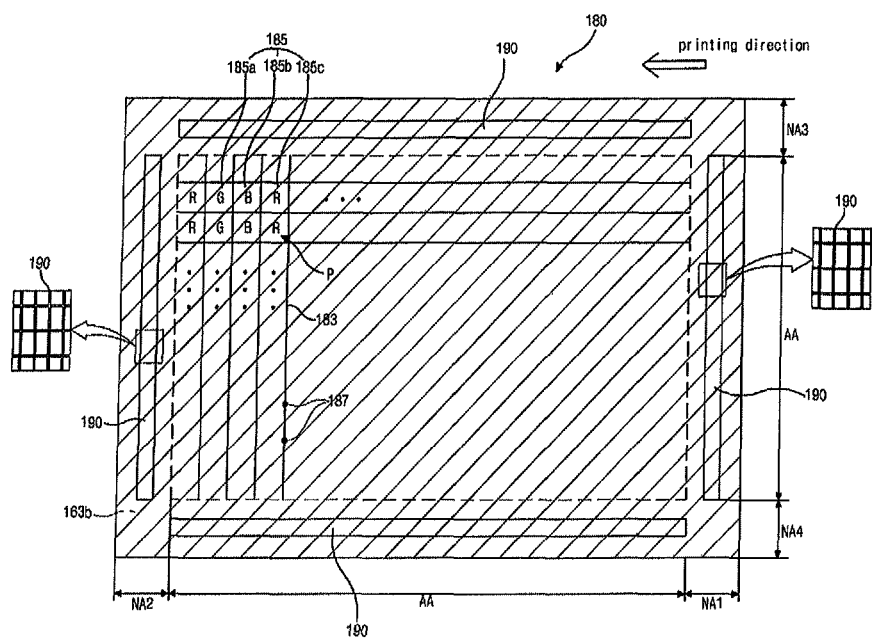

FIGS. 4A and 4B are plan views showing an array substrate and a color filter substrate, respectively, for a liquid crystal display device according to an embodiment of the present invention.

In FIG. 4A, an array substrate 101 for a liquid crystal display (LCD) device includes a display area AA displaying an image and first to fourth non-display areas NA1, NA2, NA3 and NA4 surrounding the display area AA. The first to fourth non-display areas NA1, NA2, NA3 and NA4 include first and second pad areas PA1 and PA2 where gate and data pads 112 and 137 are respectively formed.

A gate line 110 and a data line 130 that cross each other to define a pixel region P are formed in the display area AA. A thin film transistor (TFT) Tr connected to the gate line 110 and the data line 130 is formed in the pixel region P. Although not shown, the TFT Tr may include a gate electrode, a gate insulating layer, a semiconductor layer, a source electrode and a drain electrode. The gate electrode is connected to the gate line 110. The gate insulating layer is formed on the gate electrode, and the semiconductor layer is formed on the gate insulating layer over the gate electrode. The semiconductor layer may include an active layer of intrinsic amorphous silicon and an ohmic contact layer of impurity-doped amorphous silicon. The source and drain electrodes are formed on the semiconductor layer and are spaced apart from each other. The source electrode is connected to the data line 130. In addition, a passivation layer is formed on the TFT Tr.

A pixel electrode 150 connected to the drain electrode of the TFT Tr is formed in the pixel region P. A common electrode may be formed in the pixel region P on the array substrate 101 according to a mode of the LCD device. For example, the pixel electrode 150 of a plate shape may be formed in the pixel region P on the array substrate 101 when the LCD device has a twisted nematic (TN) mode where a liquid crystal layer is driven by a vertical electric field. In addition, the pixel electrode and the common electrode that have a bar shape and alternate with each other may be formed in the pixel region P on the array substrate when the LCD device has an in-plane switching (IPS) mode where the liquid crystal layer is driven by a horizontal electric field. Further, a common line parallel to and spaced apart from the gate line 110 may be formed on the array substrate 101 and the common electrode may be connected to the common line.

The gate pad 112 in the first pad area PA1 is connected to the gate line 110 and the data pad 137 in the second pad area PA2 is connected to the data line 130. In addition, a first dummy pattern 170 is formed in at least one of the first to fourth non-display area NA1, NA2, NA3 and NA4 on the array substrate 101. The first dummy pattern 170 may have a length corresponding to a side of the display area AA.

FIGS. 5A to 5G are plan views showing a first dummy pattern of a liquid crystal display device according to an embodiment of the present invention.

Figure 5A:
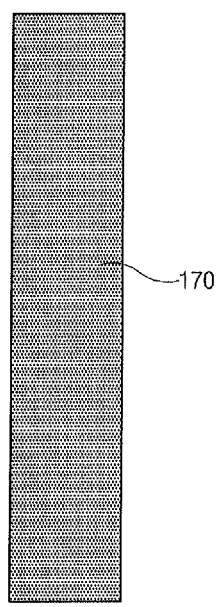
FIGS. 5A to 5G are plan views showing a first dummy pattern of a liquid crystal display device according to an embodiment of the present invention.
Figure 5B:
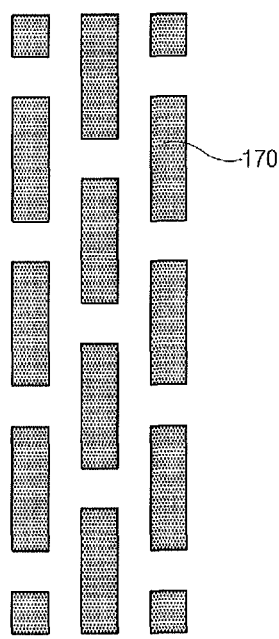
Figure 5C:
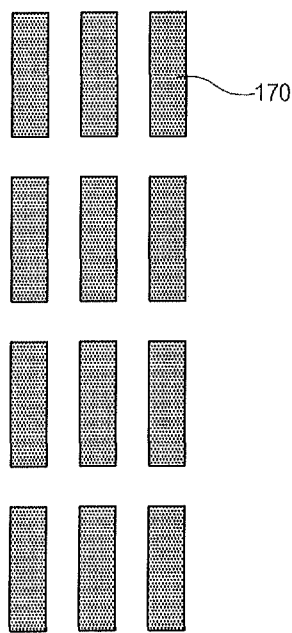

The first dummy pattern 170 may have a single bar pattern (dam shape) as shown in FIG. 5A. In addition, the first dummy pattern 170 may have a plurality of bar patterns spaced apart from each other as shown in FIGS. 5B and 5C. In FIG. 5B, the plurality of bar patterns are alternately disposed with each other such that ends of the adjacent bar patterns are not flush with each other. In FIG. 5C, the plurality of bar patterns are disposed such that ends of the adjacent bar patterns are flush with each other. Although the adjacent bar patterns are spaced apart from each other by an equal distance in FIGS. 5B and 5C, the adjacent bar patterns may be spaced apart from each other by a gradually increasing or decreasing distance in another embodiment.

Figure 5D:
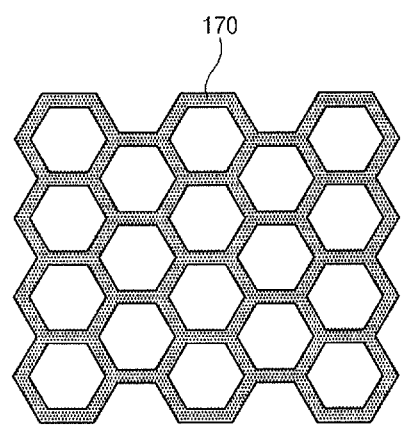
Figure 5E:
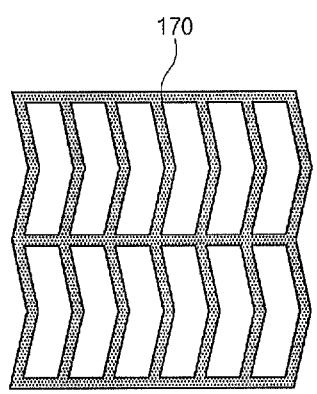
Figure 5F:
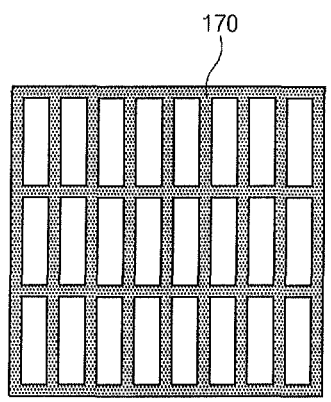
Figure 5G:
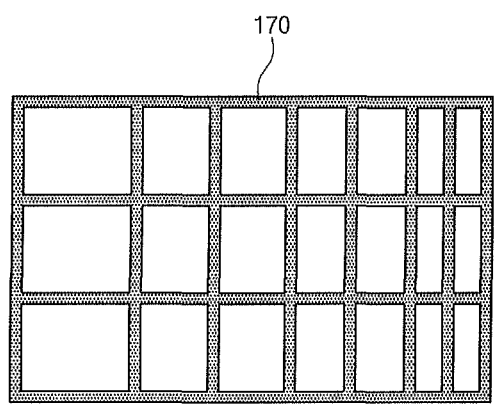

Further, the first dummy pattern 170 may have a lattice pattern as shown in FIGS. 5D to 5G. For example, the lattice pattern may include an opening having one of a hexagonal shape, a bent rectangular shape and a rectangular shape. In FIGS. 5D to 5F, the opening of the lattice pattern has an equal size (area). In FIG. 5E, the opening of the lattice pattern has a gradually increasing or decreasing size (area).

Referring again to FIG. 4A, the first dummy pattern 170 may have a height of about 0.5 μm to about 3 μm and a width of about 20 μm to about 200 μm. For example, the first dummy pattern 170 may have a width of about 50 μm to about 200 μm when the first dummy pattern 170 has the single bar pattern as shown in FIG. 5A. In addition, the first dummy pattern 170 may have a width of about 20 μm to about 50 μm when the first dummy pattern 170 has one of the plurality of bar patterns as shown in FIGS. 5B and 5C and the lattice pattern as shown in FIGS. 5D to 5G.

The height of the first dummy pattern 170 may vary with a position of the first dummy pattern 170. As the height of the first dummy pattern 170 increases, a thickness of the orientation film 163a decreases. Accordingly, a mount of the orientation film is prevented by adjusting the height of the first dummy pattern 170. For example, when the printing step for an orientation film starts at the first non-display area NA1 and ends at the second non-display area NA2, a first height of the first dummy pattern 170 in the first non-display area NA1 may be smaller than a second height of the first dummy pattern 170 in the second non-display area NA2.

In addition, when the first dummy pattern 170 has one of the plurality of bar patterns as shown in FIGS. 5B and 5C and the lattice pattern as shown in FIGS. 5D to 5G, the distance between the adjacent bar patterns or the size (area) of the opening of the lattice pattern (i.e., lattice density) may vary with a position of the first dummy pattern 170. As the distance between the adjacent bar patterns or the size of the opening increases, a thickness of the orientation film decreases. Accordingly, a mount of the orientation film is prevented by adjusting the distance between adjacent bar patterns or the size of the opening of the lattice pattern of the first dummy pattern 170. For example, when the printing step for an orientation film starts at the first non-display area NA1 and ends at the second non-display area NA2, a first distance between the adjacent bar patterns of the first dummy pattern 170 in the first non-display area NA1 may be smaller than a second distance between the adjacent bar patterns of the first dummy pattern 170 in the second non-display area NA2 for the first dummy pattern 170 of the plurality of bar patterns as shown in FIGS. 5B and 5C. In addition, a first size (area) of the opening of the lattice pattern of the first dummy pattern 170 in the first non-display area NA1 may be smaller than a second size (area) of the opening of the lattice pattern of the first dummy pattern 170 in the second non-display area NA2 for the first dummy pattern 170 having the lattice pattern as shown in FIGS. 5D to 5G.

The first dummy pattern 170 may be formed of a multiple layer used for fabricating the array substrate 101. FIGS. 6A to 6D are cross-sectional views showing a first dummy pattern of a liquid crystal display device according to an embodiment of the present invention.

Figure 6A:
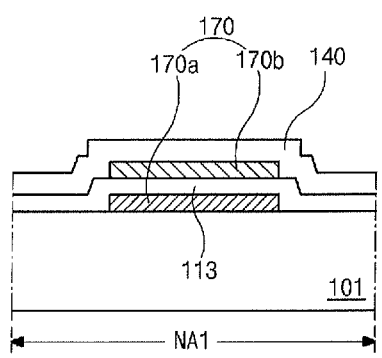
FIGS. 6A to 6D are cross-sectional views showing a first dummy pattern of a liquid crystal display device according to an embodiment of the present invention.

In FIGS. 4A and 6A, the first dummy pattern 170 in the first and fourth non-display areas NA1 and NA4 may have a double-layered structure including a gate dummy layer 170a and a data dummy layer 170b over the array substrate 101. Since the first and fourth non-display areas NA1 and NA4 do not include the first and second pad areas PA1 and PA2, the gate dummy layer 170a may include the same layer and the same material as the gate line 110 and the data dummy layer 170b may include the same layer and the same material as the data line 130. In addition, the first dummy pattern 170 may have at least one of the single bar pattern, a plurality of bar patterns and the lattice pattern as shown in FIGS. 5A to 5G. For example, the gate dummy layer 170a and the data dummy layer 170b may overlap each other with the same shape and the same area as each other. In addition, the gate dummy layer 170a may be formed on the array substrate 101, a gate insulating layer 113 may be formed between the gate dummy layer 170a and the data dummy layer 170b, and a passivation layer 140 may be formed on the data dummy layer 170b.

Figure 6B:
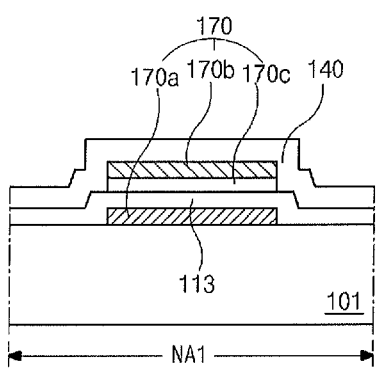

In FIGS. 4A and 6B, the first dummy pattern 170 in the first and fourth non-display areas NA1 and NA4 may have a triple-layered structure including a gate dummy layer 170a, a semiconductor dummy layer 170c and a data dummy layer 170b over the array substrate 101. Since the first and fourth non-display areas NA1 and NA4 do not include the first and second pad areas PA1 and PA2, the gate dummy layer 170a may include the same layer and the same material as the gate line 110, the semiconductor dummy layer 170c may include the same layer and the same material as the semiconductor layer, and the data dummy layer 170b may include the same layer and the same material as the data line 130. In addition, the first dummy pattern 170 may have at least one of the single bar pattern, a plurality of bar patterns and the lattice pattern as shown in FIGS. 5A to 5G. For example, the gate dummy layer 170a, the semiconductor dummy layer 170c and the data dummy layer 170b may overlap each other with the same shape and the same area as each other. Further, the gate dummy layer 170a may be formed on the array substrate 101, and a gate insulating layer 113 may be formed between the gate dummy layer 170a and the semiconductor dummy layer 170c. Moreover, the data dummy layer 170b may be formed on the semiconductor dummy layer 170c, and a passivation layer 140 may be formed on the data dummy layer 170b.

Figure 6C:
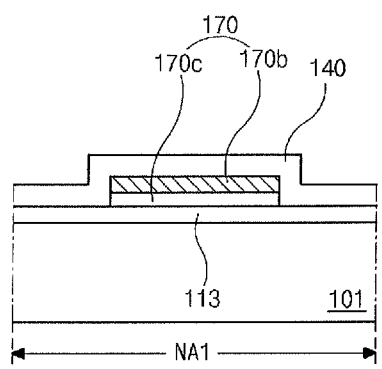

In FIGS. 4A and 6C, the first dummy pattern 170 in the second non-display areas NA2 may be disposed between the first pad area PA1 and the display area AA and may have a double-layered structure including a semiconductor dummy layer 170c and a data dummy layer 170b over the array substrate 101. Since the second non-display areas NA2 includes the first pad area PA1, the semiconductor dummy layer 170c may include the same layer and the same material as the semiconductor layer and the data dummy layer 170b may include the same layer and the same material as the data line 130. In addition, the first dummy pattern 170 may have at least one of the single bar pattern, a plurality of bar patterns and the lattice pattern as shown in FIGS. 5A to 5G. For example, the semiconductor dummy layer 170c and the data dummy layer 170b may overlap each other with the same shape and the same area as each other. Further, the semiconductor dummy layer 170c and the data dummy layer 170b may be sequentially formed on a gate insulating layer 113, and a passivation layer 140 may be formed on the data dummy layer 170b.

Alternatively, the first dummy pattern 170 in the second non-display areas NA2 may be disposed between the first pad area PA1 and the display area AA and may have a triple-layered structure including a gate dummy layer 170a, a semiconductor dummy layer 170c and a data dummy layer 170b over the array substrate 101. Since the second non-display areas NA2 includes the first pad area PA1, the first dummy pattern 170 may have a plurality of bar patterns as shown in FIG. 5C such that the gate line 110 is disposed between adjacent bar patterns. For example, the gate dummy layer 170a, the semiconductor dummy layer 170c and the data dummy layer 170b may overlap each other with the same shape and the same area as each other. Further, the gate dummy layer 170a may include the same layer and the same material as the gate line 110, the semiconductor dummy layer 170c may include the same layer and the same material as the semiconductor layer, and the data dummy layer 170b may include the same layer and the same material as the data line 130.

Similarly, the first dummy pattern 170 in the third non-display areas NA3 may be disposed between the second pad area PA2 and the display area AA and may have a double-layered structure including a gate dummy layer 170a and a semiconductor dummy layer 170c over the array substrate 101 and may have at least one of the single bar pattern, a plurality of bar patterns and the lattice pattern as shown in FIGS. 5A to 5G. Alternatively, the first dummy pattern 170 in the third non-display areas NA3 may be disposed between the second pad area PA2 and the display area AA and may have a triple-layered structure including a gate dummy layer 170a, a semiconductor dummy layer 170c and a data dummy layer 170b over the array substrate 101 and may have a plurality of bar patterns as shown in FIG. 5C.

When the first dummy pattern 170 has one of a plurality of bar patterns as shown in FIGS. 5C and 5C and a lattice pattern as shown in FIGS. 5D to 5G, a distance between the adjacent bar patterns or a shape of an opening of the lattice pattern may be adjusted according to a position of the first dummy pattern 170. In addition, a height of the first dummy pattern 170 may be adjusted by omitting at least one of the gate dummy layer 170a, the semiconductor dummy layer 170c and the data dummy layer 170b.

The first dummy pattern 170 causes a step difference in the passivation layer 140 and the step difference of the passivation layer 140 prevents a mount of the orientation film and a zigzag line of the ending and starting portions of the orientation film. As a result, a bezel region of the LCD device is reduced.

Figure 6D:
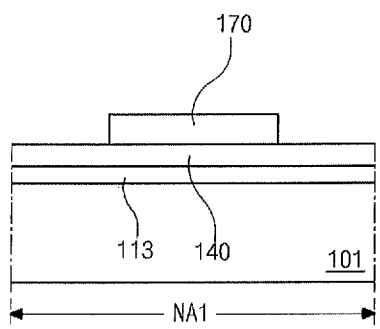

Although the first dummy pattern 170 in the first to fourth non-display areas NA1, NA2, NA3 and NA4 is formed of the layers used for the TFT Tr (of FIG. 4A) of the array substrate 101 in FIGS. 6A to 6C, the first dummy pattern 170 may be formed of an organic material as shown in FIG. 6D. For example, the first dummy pattern 170 in the first to fourth non-display areas NA1, NA2, NA3 and NA4 may be formed on a passivation layer 140 by coating and patterning an organic material such as acrylic resin and benzocyclobutene (BCB).

In FIG. 4B, a color filter substrate 180 for the LCD device also includes the display area AA and the first to fourth non-display areas NA1, NA2, NA3 and NA4 surrounding the display area AA. A black matrix 183 is formed along a boundary of the pixel region P in the display area AA and a color filter layer 185 is formed in the pixel region P exposed through the black matrix 183. The color filter layer 185 includes red, green and blue color filters 185a, 185b and 185c sequentially repeated in the pixel regions P.

Although not shown, a common electrode may be formed on the color filter substrate 180 according to a mode of the LCD device. For example, the common electrode and an overcoat layer may be sequentially formed on an entire surface of the color filter layer 185 and the pixel electrode 150 (of FIG. 4A) may be formed in the pixel region P on the array substrate 101 (of FIG. 4A) when the LCD device has a TN mode. In addition, an overcoat layer may be formed on an entire surface of the color filter layer 185 and the pixel electrode and the common electrode of a bar shape may be formed in the pixel region P on the array substrate 101 when the LCD device has an IPS mode. The overcoat layer may be omitted. A plurality of patterned spacers 187 for maintaining a uniform cell gap may be formed on one of the common electrode and the overcoat layer. The plurality of patterned spacers may be spaced apart from each other to correspond to the black matrix 183.

A second dummy pattern 190 is formed in at least one of first to fourth non-display areas NA1, NA2, NA3 and NA4 on the color filter substrate 180. The second dummy pattern 190 may have a length corresponding to a side of the display area AA. In addition, the second dummy pattern 190 may have a height of about 0.5 μm to about 3 μm and a width of about 20 μm to about 200 μm. In addition, the second dummy pattern 190 may have at least one of the single bar pattern similarly to FIG. 5A, the plurality of bar patterns similarly to FIGS. 5B and 5C and the lattice pattern similarly to FIGS. 5D to 5G.

Figure 7A:
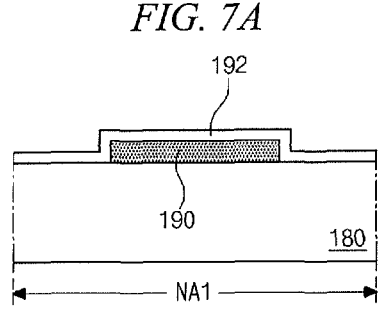
FIGS. 7A and 7B are cross-sectional views showing a second dummy pattern of a liquid crystal display device according to an embodiment of the present invention.
Figure 7B:
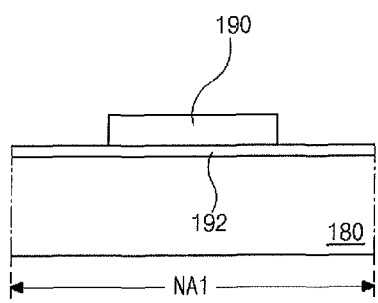

FIGS. 7A and 7B are cross-sectional views showing a second dummy pattern of a liquid crystal display device according to an embodiment of the present invention.

In FIGS. 4B and 7A, the second dummy pattern 190 in the first to fourth non-display areas NA1, NA2, NA3 and NA4 may have a single-layered structure over the color filter substrate 180. The second dummy pattern 190 may include the same layer and the same material as the black matrix 183 and the common electrode 192 may be formed on the second dummy pattern 190. The second dummy pattern 190 causes a step difference in the common electrode 192 and the step difference of the common electrode 192 prevents a mount of the orientation film and a zigzag line of the ending portion of the orientation film. As a result, a bezel region of the LCD device is reduced.

In FIGS. 4B and 7B, the second dummy pattern 190 in the first to fourth non-display areas NA1, NA2, NA3 and NA4 may have a single-layered structure over the color filter substrate 180. The second dummy pattern 190 may include the same layer and the same material as the patterned spacer and may be formed on one of the common electrode 192 and the overcoat layer. The second dummy pattern 190 generates a step difference that prevents a mount of the orientation film 163b and a zigzag line of the ending and starting portions of the orientation film. As a result, a bezel region of the LCD device is reduced.

Although not shown, an orientation film is formed on each of the array substrate 101 and the color filter substrate 180 by printing a polymeric material such as polyimide and the orientation film is rubbed with a rubbing cloth without generation of a mount of the orientation film due to the first and second dummy patterns 170 and 190. The array substrate 101 and the color filter substrate 180 having the orientation film are attached with a liquid crystal layer interposed therebetween by a seal pattern to complete the LCD device.

Consequently, in an LCD device according to the present disclosure, a dummy pattern that prevents a mount of an orientation film is formed in a non-display area surrounding a display area. As a result, a mount having a relatively great thickness at starting and ending portions of the orientation film is prevented. Since the mount of the orientation film is prevented, deterioration in a rubbing step is prevented. In addition, lifting of the orientation film due to contact with a seal pattern is prevented. Further, since the starting and ending portions of the orientation film have a straight line instead of a zigzag line due to the dummy pattern, a margin for an alignment error and a bezel region are reduced and the LCD device obtains a narrow bezel.

It will be apparent to those skilled in the art that various modifications and variations can be made in a substrate and a liquid crystal display device including the substrate of the present disclosure without departing from the sprit or scope of the invention. Thus, it is intended that the present invention covers the modifications and variations of this invention provided they come within the scope of the appended claims and their equivalents.

What is claimed is:

1. A liquid crystal display device, comprising:
    first and second substrate facing and spaced apart from each other, the first and second substrates including a display area displaying an image and a non-display area surrounding the display area;
    a gate line and a data line over an inner surface of the first substrate, the gate line and the data line crossing each other to define a pixel region;
    a thin film transistor (TFT) connected to the gate line and the data line;
    a pixel electrode connected to the thin film transistor;
    a first dummy pattern in the non-display area over the inner surface of the first substrate, the first dummy pattern having a length that corresponds to a length of a side of the display area, the first dummy pattern including at least one layer that is of a same layer and a same material of one of a semiconductor material comprising the same material as the semiconductor material of the TFT, the data line, or the gate line;
    a first orientation film on the pixel electrode, and the first dummy pattern;
    a black matrix over an inner surface of the second substrate;
    a color filter layer in the pixel region, the color filter layer including red, green and blue color filters sequentially repeated in the pixel region; and
    a second dummy pattern in the non-display area over the inner surface of the second substrate, the second dummy pattern having a length that corresponds to the length of the side of the display area;
    a second orientation film on the color filter layer, and the second dummy pattern; and
    a liquid crystal layer between the first and second orientation films,
    wherein each of the first and second dummy patterns includes a first pattern in the first non-display area and a second pattern in the second non-display area, and
    wherein the first pattern in the first non-display area is different from the second pattern in the second non-display area.

2. The device according to claim 1, wherein each of the first and second dummy patterns has at least one of a single bar pattern, a plurality of bar patterns spaced apart from each other and a lattice pattern including an opening that has one of a hexagonal shape, a bent rectangular shape and a rectangular shape.

3. The device according to claim 2, wherein each of the first and second dummy patterns has one of the plurality of bar patterns and the lattice pattern including the opening, and wherein a distance between adjacent bar patterns varies with a position of each of the first and second dummy patterns and an area of the opening varies with a position of each of the first and second dummy patterns.

4. The device according to claim 2, wherein adjacent bar patterns are spaced apart from each other by one of a gradually increasing distance and a gradually decreasing distance, and the opening has one of a gradually increasing area and a gradually decreasing area.

5. The device according to claim 2, wherein each of the first and second dummy patterns has one of the plurality of bar patterns that are alternately disposed with each other and the plurality of bar patterns whose ends are flush with each other.

6. The device according to claim 1, wherein an entire upper surface of the first dummy pattern is flat.

7. The device according to claim 1, further comprising a passivation layer on an entire surface of the first substrate, wherein the first dummy pattern causes a step difference in the passivation layer in the non-display region.

8. The device according to claim 1, wherein second dummy pattern includes at least one layer that is of a same layer and a same material of the black matrix.

9. The device according to claim 8, further comprising a common electrode on an entire surface of the second substrate, wherein the second dummy pattern causes a step difference in the common electrode in the non-display region.

10. A liquid crystal display device, comprising:
    first and second substrate facing and spaced apart from each other, the first and second substrates including a display area displaying an image and a non-display area surrounding the display area, the non-display area including first and second non-display areas at opposing sides of the display area;
    a first dummy pattern in the non-display area on an inner surface of the first substrate, the first dummy pattern having a length that corresponds to a length of a side of the display area;
    a first orientation film on the first dummy pattern;
    a second dummy pattern in the non-display area on an inner surface of the second substrate, the second dummy pattern having a length that corresponds to the length of the side of the display area;
    a second orientation film on the second dummy pattern; and
    a liquid crystal layer between the first and second orientation films,
    wherein each of the first and second dummy patterns includes a first pattern in the first non-display area and a second pattern in the second non-display area, and
    wherein the first pattern in the first non-display area is different from the second pattern in the second non-display area.

11. The device according to claim 10, wherein a height of the first pattern is different from a height of the second pattern.

12. The device according to claim 10, wherein each of the first and second dummy patterns is a bar pattern including a plurality of bars,
- wherein the plurality of bars are aligned into a plurality of rows parallel to opposing sides of the display region,
- wherein the plurality of bars are spaced apart by a distance along a direction perpendicular to opposing sides of the display region, and
- wherein the distance in the first non-display area is different from the distance in the second non-display area.

13. The device according to claim 10, wherein each of the first and second patterns is a lattice pattern,
- wherein the lattice pattern includes a plurality of segments connected to each other to define a plurality of openings, and
- wherein a size of each of the plurality of openings in the first non-display area is different from a size of each of the plurality of openings in the second non-display area.

* * * * *